United States Patent [19]

Wyant et al.

[11] Patent Number: 4,639,139
[45] Date of Patent: Jan. 27, 1987

[54] OPTICAL PROFILER USING IMPROVED PHASE SHIFTING INTERFEROMETRY

[75] Inventors: James C. Wyant; Keith N. Prettyjohns, both of Tucson, Ariz.

[73] Assignee: Wyko Corporation, Tucson, Ariz.

[21] Appl. No.: 781,261

[22] Filed: Sep. 27, 1985

[51] Int. Cl.$^4$ .............................. G01B 9/02
[52] U.S. Cl. ............................ 356/359; 356/360
[58] Field of Search ........... 356/349, 351, 359, 360; 364/525, 575

[56] References Cited

U.S. PATENT DOCUMENTS

| | | | |
|---|---|---|---|
| 3,694,088 | 9/1972 | Gallagher et al. | 356/106 |
| 3,796,495 | 3/1974 | Laub | 356/359 X |
| 4,225,240 | 9/1980 | Balasubramanian | 356/360 |
| 4,576,479 | 3/1986 | Downs | 356/359 X |

FOREIGN PATENT DOCUMENTS 2109545  6/1983  United Kingdom ......... 356/359 X

OTHER PUBLICATIONS

Schwider, et al. "Digital Wave-Front Measuring Interferometry: Some Systematic Error Sources" *Applied Optics*, vol. 22, No. 21, 11/83, pp. 3421-3432.
Wyant et al., "An Optical Profiler for Surface Characterization of Magnetic Media", 38th Annual Meeting ASLE, Houston, Tex., 4/83.
Wyant, "Use of an AC Heterodyne Lateral Shear Interferometer with Real Time Wavefront Correction Systems", *Applied Optics*, vol. 14, No. 11, 11/75.

Primary Examiner—Eugene R. LaRoche
Assistant Examiner—Steven J. Mottola
Attorney, Agent, or Firm—Cahill, Sutton & Thomas

[57] ABSTRACT

An optical profiler includes a two-beam interferometer. An interference pattern produced thereby is focused onto an array of photocells. Phase shift in a reference beam of the interferometer is produced by accelerating a piezoelectric transducer supporting the interferometer mirror to a constant velocity. The velocity is maintained constant for at least 360° of phase shift, during which four integrated buckets are obtained from each photocell. The outputs of the photodetector array are continuously integrated and effectively read out every 90° of phase shift of the reference beam by a computer that computes a first value of phase corresponding to each photocell output from the first, second, and third integrated buckets produced by that photocell and a second phase value from the second, third, and fourth integrated bucket values obtained from that photocell. The two phase values are averaged, eliminating the effects of sinusoidal noise produced by inaccuracies in the reference beam phase at which integrated buckets are initiated and terminated. Data points at which intensity modulation produced by the reference beam phase variation is less than a noise threshold are masked from phase calculations. The intensity of the interferometer light source is automatically controlled by averaging intensity of the intereference pattern at angles that differ by 180° to cancel out the effects of the interference and obtain an average intensity. The lamp voltage is automatically adjusted to maintain the average intensity.

24 Claims, 8 Drawing Figures

FIG-4

OPTICAL PROFILER USING IMPROVED PHASE SHIFTING INTERFEROMETRY

BACKGROUND OF THE INVENTION

The invention relates to minimizing inaccuracies in two-beam interferometer measurements that are due to vibration, temperature variations, air turbulence, nonlinearities in the phase of the reference beam, and errors in the starting points of a phase shifting mirror of the interferometer.

Use of phase shifting interferometry to make optical profilers or profilometers to measure the roughness of a test surface is known, for example, as described in "An Optical Profilometer for Surface Characterization of Magnetic Media", presented by Wyant et al. at the 38th Annual Meeting of the ASLE (American Society of Lubrication Engineers) in Houston, Tex., Apr. 24-28, 1983 and incorporated herein by reference, and also as described in "Optical Profilers for Surface Roughness", by Wyant, published in the Proceedings of the International Society for Optical Engineers, Vol. 525, Jan. 21-22, 1985, a copy of which is attached hereto as Appendix A. One phase shifting technique provides more effective and accurate height measurements than can be obtained by viewing interference fringes and measuring how far they depart from being straight and equally spaced, is the "phase stepping" technique, described in the foregoing references. Another phase shifting technique, first described by Wyant in "Use of an AC Hetrodyne Lateral Shear Inteferometer with Real-Time Wavefront Correction Systems", Applied Optics, Volume 14, No. 11, November 1975, page 2622, and incorporated herein by reference, is known as the integrating-bucket technique, wherein the reference mirror of the interferometer is moved at a constant velocity, rather than a stepped velocity. The integrating-bucket technique is often preferred, since less vibration is introduced into the system than when the movement of the interferometer mirror is stepped.

Those skilled in the art will recognize that any vibration of interferometry apparatus results in measurement inaccuracies. For example, in an optical profiler in which measurement techniques that approach the limits of the present state of the art, variations in air turbulence, and expansion and contraction of the apparatus as a result of changes in temperature, nonlinearities and calculation in the piezoelectric transducer and environmental effects on the piezoelectric transducer also are sources of significant error in the phase calculations and hence in the height measurements that must be made. As another example, in a laser diode tester using interferometry techniques to measure an interference pattern by means of a photodetector array and utilizing integrated bucket techniques to obtain the needed phase computations, the foregoing variations also are sources of significant error.

One approach for reducing such inaccuracies has been to use the single pass, four-bucket integrating technique, wherein all four "buckets" are utilized in a single calculation to obtain the phase for each detected point across the inteference pattern, as described by Wyant in the above November, 1975 article. This technique suffers from certain shortcomings, the main one being that it does not result in effective cancellation of sinusoidal error caused by phase differences other than 90° between the integrated buckets, so severe errors are introduced phase computations by slight (i.e., half degree) errors in the 90° phase shifts that constitute the integrating boundaries of the integrated buckets. Another prior approach has been to make a second pass and "collect" four more integrated buckets and use them to compute a second phase value, with the reference beam phase 90° different than for the first phase value, and then average the first and second phase values. This technique, which is described in "Digital Wave-Front Measuring Interferometer: Some Systematic Error Sources" by Schwider, Applied Optics, November 1983, Volume 22, No. 21, page 3421, does not avoid errors caused by vibration and the other above-mentioned sources of error.

As those skilled in the art realize, there are numerous subtleties in the physics of interferometry. Slight alterations in the structure of the apparatus used and/or in the method of operating the apparatus may result in unexplained errors and/or anomalous results.

Thus, despite a strong market demand for faster, more accurate optical profilers, and despite extensive continuing research in the art, there still remains an unmet need for a reasonably priced optical profilometer (and other interferometry-based apparatus) that avoid the above-indicated sources of error more effectively than the prior art.

SUMMARY OF THE INVENTION

Accordingly, it is an object of the invention to provide an improved integrated bucket technique for determining phase variations in interference patterns in a two beam interferometer, in such a manner as to avoid introducing vibration into the system, to avoid inaccuracies in the measured phase of the interference pattern caused by vibration in the system, to avoid inaccuracies in the phase measurements due to rapid variations in temperature of the ambient air, and to avoid variations due to thermally caused changes in the dimensions of the apparatus.

It is another object of the invention to avoid inaccuracies due to errors in the phase shifts that constitute the integrating boundaries of an integrated bucket.

It is another object of the invention to provide an improved non-contact optical profiler using integrated bucket phase and test surface height interferometry techniques.

It is another object of the invention to avoid errors due to nonlinearities in the constant velocity phase shift in an integrated bucket interferometer.

It is another object of the invention to avoid return errors of the reference mirror in a two-beam interferometry system.

It is another object of the invention to avoid inaccuracies due to calibration errors and other errors in a piezoelectric transducer in a two-beam interferometer.

It is another object of the invention to provide an improved technique for "masking" inaccurate data points in an integrated bucket interferometer.

Briefly described, and in accordance with one embodiment thereof, the invention provides an improved single-pass, four-bucket, dual three-bucket computation integrated bucket technique for two-beam interferometers wherein the effects of fixed-pattern noise and gain variation across a photodetector array are cancelled, and effects of system vibration, rapid, thermally induced dimensional changes in the apparatus, fluctuations in air density and temperature, and reference mirror return errors are reduced. In one embodiment of the invention, a non-contact optical profiler or profilometer is provided wherein a Mirau interferometer is illuminated through a conventional microscope illumination system. The reference mirror of the interferometer is moved by a piezoelectric transducer in response to a ramp voltage signal applied thereto. An interference light pattern produced by interference between light reflected from a test surface and the interferometer reference mirror is directed onto a 256×256 array of photodiodes, the photocurrents of which are integrated by integrated bucket capacitors, analog voltage levels of which are discharged into cells of a bucket-brigade type of shift register in accordance with clock signals produced by a clock generator circuit. Ramping of the piezoelectric transducer driver circuit is synchronized with readout of the photodiode array, so that, after an initial time has been allowed for a reference mirror to attain constant velocity, the integrated buckets produced by the entire photodiode array are discharged into the shift register cells and then read out as the constant velocity reference mirror moves enough to change the phase of the inteference beam by approximately 90°, to provide a first integrated bucket. Three more integrated buckets are provided as the reference mirror maintains the constant velocity to complete a single pass, after which the reference mirror returns to its starting points. Each integrated bucket is obtained by reading out a voltage representative of the integrated currents for the entire array every time the reference mirror has moved enough to change the phase of the reference beam by approximately 90°. The first, and second, and third integrated buckets are utilized to compute a first value of the phase of the interference pattern, and the second, third, and fourth integrated bucket values are used to compute a second phase value. The first and second phase values are averaged, thereby cancelling sinusoidal error caused by inpreciseness in the desired 90° phase changes during which the four integrated buckets for each photodetector are produced. Data points corresponding to each photocell of the array are tested to determine whether a sufficiently high degree of modulation of the intensity of the interference pattern is produced in response to the variations in the phase of the reference beam that the corresponding data point can be considered meaningful. If not, a value is assigned to the average phase indicating that it is an invalid data point. Automatic control of the intensity of the lamp illuminating the Mirau interferometer is achieved by averaging two intensity measurements that are taken with the phase differences between the two interfering beams 180° apart. The two intensity measurements are averaged, cancelling the effect of the interference. The filament voltage of the lamp is adjusted to cause the average intensity to equal a predetermined value.

DESCRIPTION OF THE INVENTION

Figure 1:
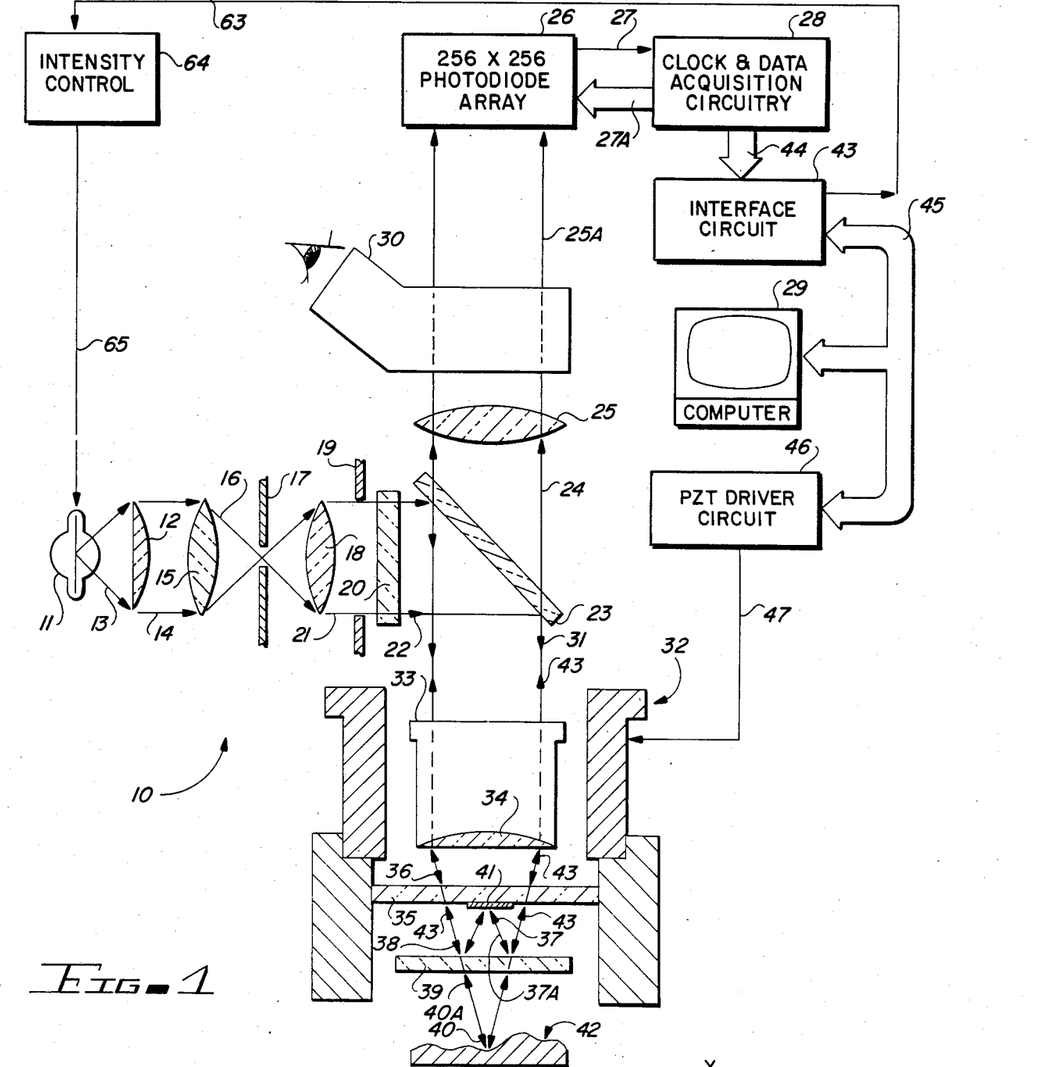
FIG. 1 is a schematic diagram of a non-contact optical profiler of the present invention.

Referring first to FIG. 1, reference numeral 10 designates an optical profiler of the present invention, including a tungsten light source 11. Tungsten light source 11 produces a beam 13 that is focused by a lens 12 to produce a collimated beam 14 that is further focused by a lens 15 to produce beam 16. Beam 16 passes through an aperture in a field stop 17 to another lens 18. The resulting beam 21 passes through an aperture stop 19 and a spectral filter 20 to produce a beam 22 that impinges upon a beam splitter 23. Lenses 12 and 15 and field stop 17 are components of a commercially available illuminator sold by Nikon as FE Illuminator Part No. 79500.

Beam 22 is reflected downward in FIG. 1 by beam splitter 23, producing beam 31, which passes into a microscope objective 33 and a lens 34 therein, also available from Nikon as Part No. 79101 or 79100. The beam 31 is thereby focused to produce beam 36, which enters a Mirau interferometer, a reference mirror 41 and transparent mirror support plate 35 of which are supported by a piezoelectric transducer (PZT) designated by reference numeral 32.

The Mirau inteferometer also includes a beam splitter 39. Beam 36 passes through mirror support 35, is refracted slightly, and emerges as beam 38. Part of beam 38 impinges on beam splitter 39 and is reflected upward as beam 37. Beam 37 is reflected as a reference beam 37A from reference surface 41 back to beam splitter 39.

Part of the light 38 passes through beam splitter 39, as indicated by reference numeral 40. Beam 40 then is reflected from the irregular upper surface of the test surface 42, as indicated by reference numeral 40A.

An interference pattern is created at beam splitter 39 as a result of interference between beams 37A and 40A, producing an interference pattern on beam 43, passing upward through lens 34, the intensity of which is, of course, a function of the difference in phase between beams 37A and 40A.

Figure 2A:
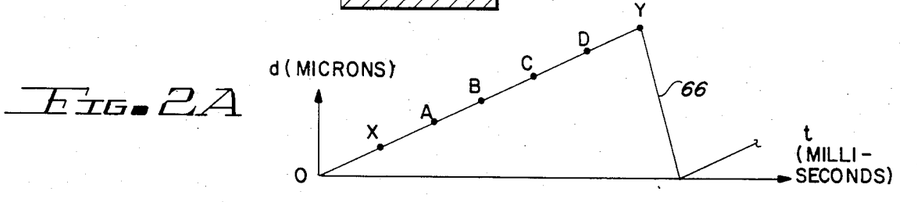
FIGS. 2A and 2B are diagrams illustrating constant velocity movement of the reference mirror in the optical profiler of FIG. 1 for two different kinds of photodetection arrays, respectively.

The spacing between the reference surface 41 and the beam splitter surface 39 is varied in accordance with the graph shown in FIG. 2, in response to an electrical ramp signal on conductor 47 that is proportional to the vertical movement of the reference surface 41 produced by piezoelectric transducer 32.

The interference beam 43 passes upward through beam splitter 23, as indicated by reference numeral 24, is focused by lens 25 onto a 256 by 256 photodiode array, which can be an RA256-x-256 photodiode array manufactured by E. G. & G. Reticon of Sunnyvale, Calif. Eyepiece 30 allows an operator to visualize the point of the test surface 42 at which optical profiling is being performed.

The microscope assembly including eyepiece 30, lens 25, beam splitter 23, objective 33 and lens 34 therein is a Model 79007 or 79500 produced by Nikon. The piezoelectric transducer (PZT) 32 can be a Model PZ-91, obtained from the Burleigh Company.

The photodiode array 26 is scanned by signals produced on lines 27A by clock and data acquisition circuit 28. The E. G. & G. Reticon RA256-x-256 includes internal multiplexing circuitry that decodes the seven lines 27A to produce the necessary diode-by-diode scanning of the 65,536 photodiodes in array 26 to produce 65,536 sequential analog levels representing the integrated light intensity of each on conductor 27, which is also connected to clock and data acquisition circuit 28. The photocurrent produced by each photodiode is continuously integrated by causing that photocurrent to flow into a corresponding integrated bucket capacitor that is coupled to a corresponding cell an analog bucket-brigade type of shift register. The photodiodes in corresponding shift register cells are arranged in rows that can be separately strobed each time the phase of the reference beam 37A changes by 90°. Such strobing turns on transfer gates that discharge the integrated bucket capacitors into the corresponding shift register cells to produce analog voltages that are stored, row-by-row, in the shift register and represent the magnitudes of the "integrated buckets". The "integrated buckets" are quantities that are used in computation of the phase variations across the interference beam 43 and the height variations of the test surface 42, as subsequently explained in detail. As the integrated bucket capacitors are recharged, the analog voltages representing the prior integrated buckets, which analog voltages are now stored in the shift register, are synchronously clocked out to produce a "video" type of analog signal on conductor 27 while the next set of integrated buckets is being generated and "collected" by the integrated bucket capacitors within the E. G & G. Reticon photodiode array 26. Clock and data acquisition circuitry 28 produces 10 output bits 44 that are digital representations of the 65,536 integrated buckets collected from photodiode array 26. These 10 bit digital numbers are formatted by interface circuit 43 so that they can be properly read by computer 29, which in the preferred embodiment of the invention is a Hewlett-Packard Model 320 desk top computer.

Computer bus 45, which includes an address bus 45A and a data bus 45B (FIG. 1B), is connected to interface circuit 43, computer 29, and PZT control circuit 46. During each complete data acquisition cycle, during which all 65,536 integrated buckets are collected, PZT control circuit 46 generates a ramp control signal on conductor 47 that causes the piezoelectric transducer 32 to move the inteferometer reference mirror surface 41, at constant velocity (see FIG. 2A), enough to shift the phase of reference beam 37A by approximately 90°. The four points at which the first row of integrated buckets are discharged into the corresponding shift register cells to "collect" the four sets of integrated buckets needed to make the phase computations according to the present invention, during a single constant velocity pass of the PZT and the reference mirror 41, are designated by points A, B, C, and D in FIG. 2A. Point X in FIG. 2A designates the time at which the integrating of the intensity begins. Integrated buckets collected between points O and X in FIG. 2A are disregarded, since this period of time is, in accordance with one aspect of the present invention, allowed so that the reference mirror 41 and the piezoelectric transducer 32 can achieve a truly linear, constant velocity. Point A in FIG. 2A represents the time at which the first row of integrated buckets collected between point X and point A are strobed, row-by-row from the internal rows of the integrated bucket capacitors of the E. G. & G Reticon self-scanning RA 256×256 solid state sensor array, into the corresponding cells of the shift register. Point B represents the time at which the first row of integrated buckets collected during the 90° phase shift between points A and point B are strobed, row-by-row, from the internal rows of integrated bucket capacitors into the shift register cells. Similarly, the first row of the third and fourth sets of integrated buckets are strobed into the shift register at the times indicated by points C and D in FIG. 2A. Point Y represents the time at which the last row of the fourth set is strobed and read out of the shift register. (It should be appreciated that the foregoing description of the internal operation of the E. G. & G. Reticon 256×256 photodiode array is not entirely precise, but is adequate for understanding the present invention. Appendix B attached hereto provides a more accurate detailed description thereof.)

The distances between points X, A, B, C, D, and Y in FIG. 2A all represent the amount of time required for a 90° phase change, or phase difference, to occur between the interfering beams 37A and 40A (FIG. 1).

Figure 2B:
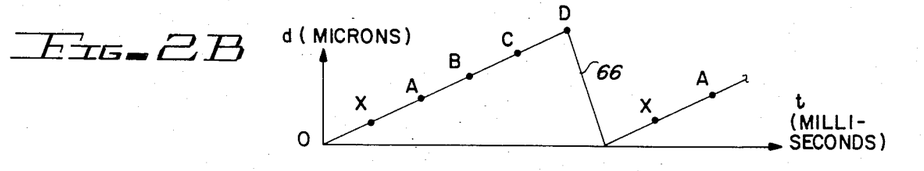

FIG. 2B represents the displacement of the reference surface 41 for a different type of photodiode array, in which the groups of photocells and corresponding integrated bucket capacitors are grouped and strobed differently than in the E. G. & G. Reticon photodiode array described above. The graph of FIG. 2A corresponds to a two-dimensional type of array in which the integrated bucket capacitors are arranged as 256 rows of 256 integrating capacitors each, each row being separately strobed into a single 256 bit shift register. The graph of FIG. 2B corresponds to an arrangement in which all of the integrated bucket capacitors can be essentially simultaneously strobed into a single long bucket-brigade type of shift register.

In accordance with the present invention, the time intervals between time O and point X in FIGS. 2A and 2B are provided to allow inertia of the piezoelectric transducer 32 and the Mirau interferometer to be overcome so that reference surface moves at a truly constant velocity. This technique prevents errors in the subsequent phase calculations due to nonlinearities in the velocity of the reference surface 41.

In FIGS. 2A and 2B, reference numeral 66 designates the return of the piezoelectric transducer 32 and the reference surface 41 to their initial positions prior to the beginning of a new constant velocity cycle.

Figures 1A, 1B, 5:
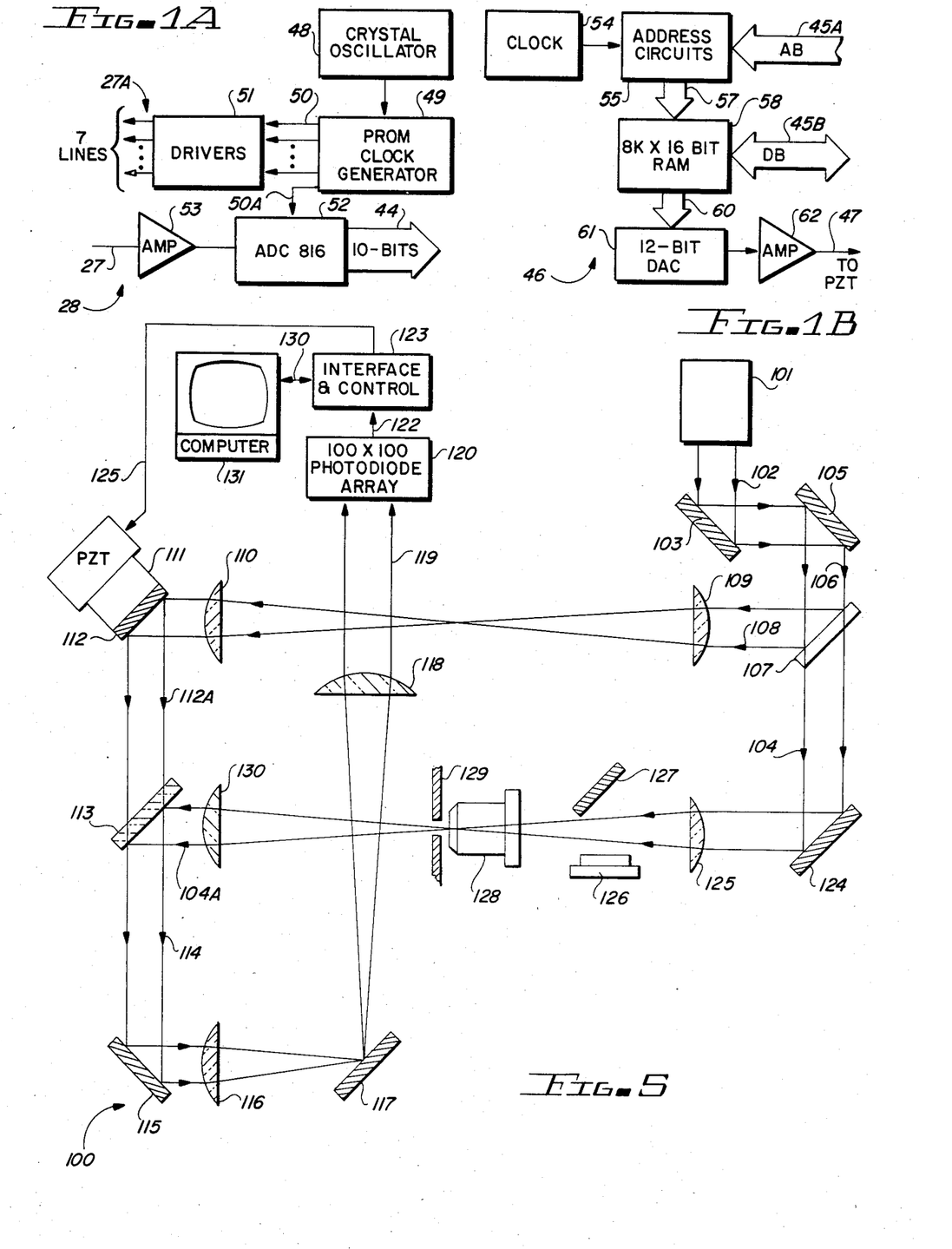
FIG 1A is a detailed block diagram of the clock and data acquisition circuitry of FIG. 1.
FIG. 1B is a detailed block diagram of a piezoelectric transducer driver circuit of FIG. 1.
FIG. 5 is a schematic diagram of a laser diode tester embodiment of the present invention.

The clock and data acquisition circuit 28 of FIG. 1 can be easily implemented by one skilled in the art, as this type of circuitry is common. The presently preferred implementation is indicated in FIG. 1A, wherein an ordinary crystal oscillator 48 increments an address counter of a programmable read-only memory 49. Read-only memory 40 produces a plurality of clock signals 50 that are applied to inputs of a plurality of ordinary driver circuits 51. The resulting outputs 27A are applied to the inputs of photodiode array 26 in accordance with the specifications thereof in order to effectuate scanning or strobing of the 256 rows of 256 integrated buckets each from the integrated bucket capacitors into the shift register cells.

The resulting analog signal produced by photodiode array 26 and conductors 127 is amplified by an ordinary amplifier 53, the output of which is connected to the input of a 10 bit analog to digital converter 52, which can be an ADC 816 type of analog-to-digital converter which is available from the Datel-Intersil Company. The resulting 10 bit digital output produced on conductors 44 then represents the magnitude of the analog integrated bucket level presently on conductor 27. PROM clock generator circuit 49 also produces a "convert" signal 50A that synchronizes the analog-to-digital conversion of each amplified integrated bucket voltage level with the shifting of that level out of the shift register inside photodiode array 26. A copy of the preliminary specification sheet of the E. G. & G. Reticon 256×256 photodiode array 26 is attached hereto as Appendix B.

The presently preferred implementation of PZT driver circuit 46 is shown in FIG. 1B, wherein a clock circuit 54 that is synchronized with the crystal oscillator 48 of FIG. 1B increments an address counter circuit 55. An initial value of the address being incremented is preset by the circuitry in address counter circuit 55. The resulting address produced on bus 57 is applied to the address inputs of an 8192 word by 16 bit static random access memory (RAM) 58. A data pattern corresponding to the presently desired constant velocity of the reference mirror 41 for implementation of the integrated bucket technique of the present invention is initially written into RAM 58 by computer 29 via computer data bus 45B. As a result, the accessed data is produced on a 12 bit data bus 60. The digital numbers sequentially produced on RAM data bus 60 represent the uniformly increasing values of the PZT control signal 47 needed to produce the constant velocity represented by the slope of the graph in FIG. 2A or 2B. These digital numbers are converted to an analog signal by a 12 bit digital-to-analog converter 61, which can be any suitable commercially available device such as a Model DAC 85, which is available from various suppliers. The output of DAC 61 is applied to the input of a high voltage amplifier 62, the output of which produces the ramp voltage necessary on conductor 47 to produce the piezoelectric transducer and reference mirror displacement shown in FIG. 2A or 2B.

Now that the structure of the optical profiler of FIG. 1 has been set forth, and the functional operational of its components have been described, the mathematical techniques for computing the phase $\phi(x)$, which is the phase difference between the reference beam 37A and the test surface beam 40A, will be described. The height distribution $h(x)$ is determined by the equation:

$$h(x) = (\lambda/4\pi)\phi(x). \tag{1}$$

The basic equation for the intensity of the two beam interference produced by the Mirau interferometer at beam splitter 39 is given by the equation:

$$I = I_1 + I_2 \cos[\phi(x) + \phi(t)], \tag{2}$$

where $\phi(x)$ represents the phase difference between the reference beam 37A and the reference beam 40A at beam splitter 39 as a function of distance across the interference field and $\phi(t)$ represents the phase of the reference beam as a function of time.

If the intensity I is integrated while $\phi(t)$ varies from zero to 90°, from 90° to 180°, from 180° to 270°, and from 270° to 360°, the resulting signals are represented by A(x), B(x), C(x), and D(x), in accordance with the following equations:

$$A(x) = I_1' + I_2'[\cos\phi(x) - \sin\phi(x)] \tag{3}$$

$$B(x) = I_1' + I_2'[-\cos\phi(x) - \sin\phi(x)] \tag{4}$$

$$C(x) = I_1' + I_2'[-\cos\phi(x) + \sin\phi(x)] \tag{5}$$

$$D(x) = I_1' + I_2'[\cos\phi(x) + \sin\phi(x)]. \tag{6}$$

The quantities A, B, and C represented by equations (3)–(6) are the four integrated buckets that are obtained during each constant velocity pass for each photodiode, as mentioned above, and as obtained by causing the photodiode current, to flow into the above-mentioned integrated bucket capacitors.

In accordance with the present invention, a first value of $\phi(x)$, designated $\phi_1(x)$, is computed in accordance with the following equation:

$$\phi_1(x) = \tan^{-1}[C(x) - B(x)]/[A(x) - B(x)] \tag{7}$$

and a second value of $\phi(x)$ is given by the equation:

$$\phi_2(x) = \tan^{-1}[D(x) - C(x)]/[B(x) - C(x)] \tag{8}$$

If the phase shift between consecutive readouts of integrated buckets for the shift register of the detector array 26 differs from 90°, a nearly sinusoidal error is introduced into the measured phase. The spatial frequency of the sinusoidal error is equal to twice the spatial frequency of the fringes. For small variations, for example, less than about 5°, in the phase shift between consecutive readouts, the peak to peak amplitude of the sinusoidal error is approximately proportional to the deviation.

In accordance with the present invention, the sinusoidal error is nearly eliminated by calculating the phase $\phi_1(x)$ using the first three integrated buckets A(x), B(x), and C(x), as indicated in equation (7), and using the second group of three buckets B(x), C(x), and D(x) to obtain the second phase measurement $\phi_2(x)$.

The average phase $\overline{\phi}(x)$ then is obtained from the equation:

$$\overline{\phi}(x) = [\phi_1(x) + \phi_2(x)]/2. \tag{9}$$

Each of the phase measurements $\phi_1(x)$ and $\phi_2(x)$ has therein the above-mentioned sinusoidal error if there is any error in the phase of the reference beam 37A, but the phase errors associated with $\phi_1(x)$ and $\phi_2(x)$ are 180° out of phase (since the sinusoidal error has twice the spatial frequency of the interference fringes and hence of $\phi(x)$. Consequently, the sinusoidal error almost completely cancels when $\phi_1(x)$ and $\phi_2(x)$ are added, as in equation (9).

The advantage of this technique over prior single pass four bucket integrated bucket techniques for computing $\phi(x)$, as disclosed in the above-mentioned November, 1975 Applied Optics article by Wyant, is that the present techique effectively cancels out the sinusoidal error, while the prior single pass four bucket technique does not. The advantage of the present technique over the two pass, four bucket technique disclosed in the above-mentioned November, 1983 Applied Optics article is that in that reference, the two sets of measurements are separate in time, making the system very susceptible to errors caused by vibration of the apparatus, thermal expansion or contraction of the apparatus, variations in air density, variations in air temperature, etc.

The program executed by computer 29 in solving equations (4)–(9) is given in Appendix C attached hereto.

The optical profiler of FIG. 1, operated in accordance with the above method and equations (7)–(9), provides the capability of accurate, zero contact surface-heighth measurements and generating surface profiles over a small region of a sample. The data collected and the phase and/or surface heighth values computed provides a basis for statistical analysis, surface-height distributions, autocovariance functions, and spectral-density functions. Slopes and curvatures of asperities also can be computed.

The beam splitter 39 of the Mirau interferometer forms a second optical path that ends at the reference mirror surface 41. If the optical path length between the beam splitter 39 and the test surface 42 is equal to the optical path length between the beam splitter and the reference surface 41, a white light source produces a distribution of interference fringes across the beam having an intensity distribution that is represented by the various currents produced by the cells of the photodiode array 26.

The single pass integrating techniques avoid the error of the double pass four bucket technique of the above-mentioned 1983 Applied Optics article by avoiding errors that result from failure to return the piezoelectric transducer 32 and reference mirror 41 back (i.e., via path 66 in FIG. 2A or 2B) back to precisely the same starting point from which the reference surface 41 began its present constant velocity path.

As mentioned above, the intensity of the tungsten source 11 is controlled in response to the readout obtained from photodiode array 26, by virtue of the coupling 63 from the interface circuit 43 to an intensity control circuit 64. Intensity control circuit 64 contains a counter circuit that can be incremented or decremented by signals on conductor 63 to increase or decrease the voltage on conductor 65, which voltage is applied to the filament of tungsten lamp 11 and thereby controls its intensity.

A problem with prior intensity control devices for interferometers, particularly those used in non-contact profilers, is that the intensity of the light in the intereference fringes (see equation (2) above) depends both the intensity of the light source and the phase difference between the two interfering beams 37 and 40 (FIG. 1). In accordance with the present invention, a first integrated intensity measurement is taken for each of about 50 photodiode cells, each resulting in an intensity $I_A$ given by the equation:

$$I_A = I_1 + I_2 \cos \phi. \qquad (10)$$

Figure 3:
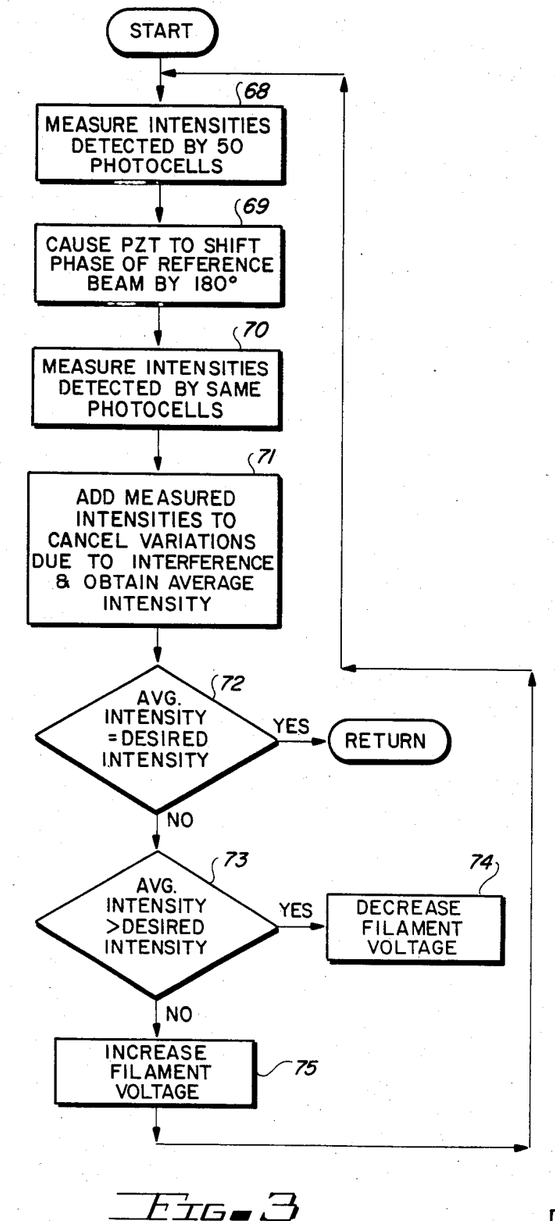
FIG. 3 is a flow chart of a routine executed by the computer of FIG. 1 to automatically control intensity of the lamp of FIG. 1.

This step is indicated by block 68 in FIG. 3, which is a flow chart of the program executed by computer 29 in order to effectuate automatic control of the tungsten source intensity. Next, computer 29 produces signals that are applied to the PZT driver circuit 46 so as to cause reference surface 41 to shift the phase of the reference beam 37A by 180°, as indicated in block 69 of FIG. 3. Next, the intensities of the same 50 photodiodes are measured and the data is read by computer 29, the integrated intensity for each cell being given by the equation:

$$I_B = I_1 - I_2 \cos \phi. \qquad (11)$$

Averaging all of the intensities for the 50 photodiode cells results in cancelling the terms of equations (10) and (11) that are due to the phase difference $\phi$ between the reference beam 37A and the test surface beam 40. Thus, the effect of the interference is cancelled out in the average intensity, as a result of the addition performed in block 71 of FIG. 3.

In decision block 72 of FIG. 3, the average intensity obtained in block 71 is compared to a predetermined desired intensity that will produce optimum performance of the photodiode array 26 and the circuitry in FIG. 1A, including amplifier 53 and analog-to-digital converter 52. If the determination of decision block 72 is that the average intensity is equal to the desired intensity, the automatic intensity control routine is exited via label 76. Otherwise, the program enters decision block 73 and determines if the average intensity exceeds the desired intensity, and if this is the case, the computer 29 sends a signal to intensity control circuitry 64 via interface circuit 43 to decrease the filament voltage of tungsten lamp 11 and exits from the subroutine. Otherwise, the program goes to block 75 and causes intensity control circuit 64 to increase the filament voltage of tungsten lamp 11.

A program executed by computer 29 to effectuate the flow chart of FIG. 3 is shown in Appendix D attached hereto.

The automatic intensity controlling capability of the described optical profiler avoids inaccuracies due to prior manual intensity control techniques in which a control knob is turned while an operator views the test surface and eliminatesthe need for the operator to adjust the tilt of the reference surface 41 to display at least two fringes on the computer monitor, manually adjust the intensity control knob to produce maximum fringe intensities, and then re-adjust the tilt of the reference surface before taking a phase or heighth measurement.

Figure 4:
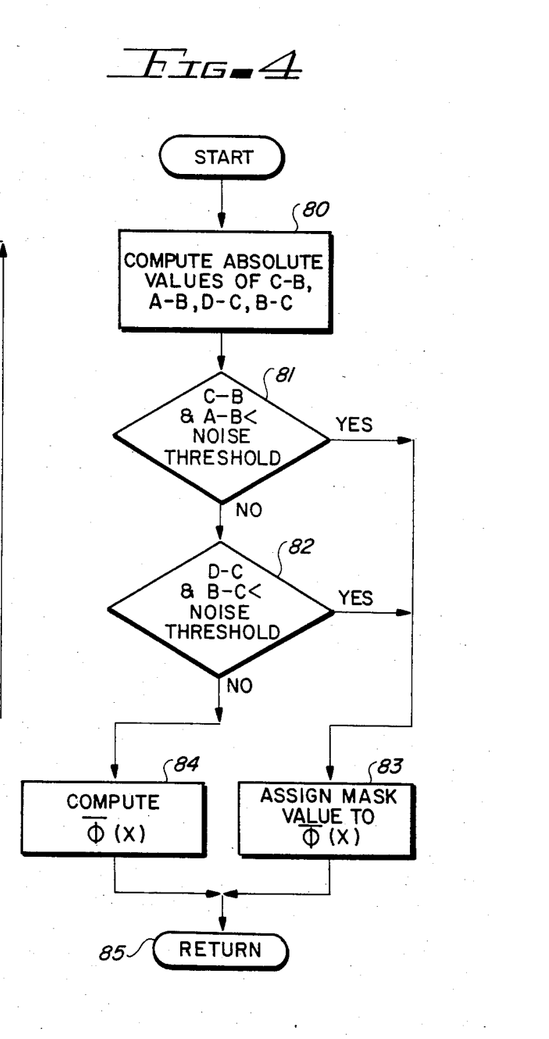
FIG. 4 is a block diagram of a program executed by the computer of FIG. 1 to mask out bad data points obtained in scanning the photodiode array of FIG. 1.

If the electronic noise and optical noise produced by the optical profiler circuitry and apparatus 10 of FIG. 1 become too large, this can result in incorrect phase calculations, and hence, in incorrect corresponding height distributions over the test surface. It is therefore important to determine if such noise is too large, for a particular data point (corresponding to a particular photocell) for a meaningful measurement to be made. To accomplish this, computer 29 executes the subroutine shown by the flow chart in FIG. 4, that determines if either the numerator or the denominator of equation (7) (or equation (8)) exceeds a predetermined value referred to as a "noise threshold". First, the program computes the numerators and denominators of the arguments of both equations (7) and (8), as indicated in block 80 of FIG. 4. If either the numerator $[C(x)-B(x)]$ or the denominator $[A(x)-B(x)]$ in equation (7), and if either the numerator $[D(x)-C(x)]$ or the denominator $[B(x)-C(x)]$ of equation (8) is larger than that noise threshold, then the phase $\phi_1(x)$ or $\phi_2(x)$ for that photocell, i.e., that data point, is computed, as indicated in blocks 81, 82, and 84 in FIG. 4. The subroutine is then executed via label 85. Otherwise, the subroutine assigns to the phase variable a value that functions as a "mask" for that data point, as indicated in block 83. For all future calculations, the assigned value indicates that the corresponding data point is invalid and should not be used in any calculation. In other words, the subroutine effectively provides a "mask" over the data set that, in effect, outlines the valid data points, and prevents invalid data points from being used in future calculations.

The reason for making the determination as to whether either $[C(x)-B(x)]$ or $[A(x)-B(x)]$ exceeds the noise threshold value, is that if either quantity has a sufficiently large value, then the modulation of intensity in response to movement of the piezoelectric transducer must be adequately large, because it is mathematically impossible for both the sine and cosine functions in equations (3) to (6) to be simultaneously small. If the modulation of the intensity of a particular data point in response to movement of the piezoelectric transducer is too small, this will cause an inaccuracy in the calculation of $\phi(x)$, and hence in $h(x)$.

The subroutine executed by computer 29 to make this determination is set forth in Appendix C attached hereto.

The above-described optical profiler has been tested and found to be capable of measuring surface heights over an area from approximately 0.5 millimeters square to 4.0 millimeters square. The device tested typically provides lateral resolution of better than (i.e., lower than) 2 microns on the test surface.

Furthermore, high vertical accuracy can be obtained even if the 90° phase shifts of the reference beam defining the integration times of the integrated buckets are inaccurate by a few (3 or 4) degrees. This is a great improvement over all prior optical profilometers, which typically produce a vertical accuracy error of at least 10 angstroms if there is an error in the 90° phase shift of the reference beam of more than about one-half of a degree. Vertical accuracy of the present instrument is about one angstrom.

As indicated in Appendix A, there are numerous two beam interferometers that may be useful in surface measuring applications, including non-contact Fizeau interferometers for testing flat surfaces, Twyman-Green interferometers for testing flat surfaces or spherical surfaces, and modified Twyman-Green interferometers for computer-generated hologram testing of aspheric surfaces. The technique of the present invention will work effectively for any two-beam interferometer. The technique of the present invention also has application in uses of two-beam inteferometers other than in non-contact optical profilers.

For example, FIG. 5 is a schematic diagram of a laser diode tester designated by reference numeral 100. Laser diode tester 100 receives a beam 102 from a laser diode 101. Beam 102 is reflected by mirrors 103 and 104 to control the direction of the resulting beam 106. Beam 106 is split by beam splitter 107 to produce two "arms" of the Mach-Zehnder interferometer shown. One arm includes beam 108, which passes through a lens 109 and through a lens 110 that is aimed onto a flat reference mirror 112, the position of which is controlled by a piezoelectric transducer 112 in response to a control voltage 125 generated in response to computer 131. Beam 112A is reflected from reference circuit 112, and passes through mirror 113 onto mirror 115. The other arm of the interferometer includes beam 104, which is reflected by mirror 124 through lens 125 and lens 128 which focuses the beam onto pinhole 129 which removes aberrations to produce the reference beam. The reference beam then passes through lens 130 onto beam splitter 113.

If the beam 112A and the reference beam 104A are out of phase at beam splitter 113, an interference pattern will be created. The interference pattern is focused mirror 115, lens 116, mirror 117, and lens 118 onto photodiode array 120. Photodiode array 120 includes integrated bucket capacitors and means for discharging the integrated bucket capacitors into the shift registers as previously described, so that the output 122 of the photodiode array in an analog "video" type of signal that contains analog signal levels that represent the various integrated buckets. These analog signals are sequentially amplified and converted to digital data in interfacing control circuitry 123, which data is then read by computer 131, in a fashion similar to that previously described with reference to FIG. 1. Computer 131 also performs calculations that are entirely analogous to those described above for computer 29A of FIG. 1 to compute the average $\overline{\phi}(x)$. From this information, the uniformity of emissions of laser diode 101 and other characteristics thereof can be determined.

The configuration of mirrors 115 and 117 and lenses 116 and 118 in FIG. 5 is not essential to the operation of the structure, and is provided only to provide a compact physical structure that will fit into a small housing. Reference numeral 126 in FIG. 5 represents a quad cell containing four separate photodetectors. It is a readily commercially available item wherein if the beam of light produced thereon by moving mirror 127 into the path of the beam 104A, mirrors 103 and/or 105 can be moved to align the beam so that the same current flows through each of the four photodetectors. The rest of the apparatus is set up so that when mirror 127 is then withdrawn from the path of beam 104A, it passes properly through objective 128 and pin hole 129 which removes aberrations in the reference beam.

While the invention has been described with reference to several embodiments thereof, those skilled in the art will be able to make various modifications to the described embodiments of the invention without departing from the true spirit and scope thereof. It is intended that structures similar to those described herein in that their elements perform substantially the same function in substantially the same way to achieve substantially the same result are to be considered within the scope of the invention. For example, other types of two-beam interferometers than those described can be used. Essentially the same function can be obtained with other types of photodetector arrays. Other techniques than by using a piezoelectric transducer to shift the reference mirror could be used for producing the constant velocity phase shift between the interference beam and the test beam. For example an acusto-optic Bragg cell could be utilized to shift the frequency (and phase) of the one both of the beams, or a moving difraction grating could be utilized to provide a doppler shift in one or both of the beams, or various rotating polarization plates could be utilized to shift the phase of one or both beams. A Zeeman split laser could be utilized to provide one frequency in one arm of the interferometer and a different frequency (and phase) in the other arm. In some instances, a vidicon camera could be used instead of a photodetector array. In general, a phase shifting mirror or other phase shifting means can be used in either arm or both arms of the interferometer It is not necessary in the method of FIG. 4 that at least two of the computed values be greater than the noise threshold before the phase computation is made. It would be possible to obtain accurate results if only one of the computed quantities exceeds the noise threshold.

What is claimed is:

1. A method of producing information representing the distribution of the phase difference between first and second interfering beams, the first and second interfering beams producing an interference pattern, the method comprising the steps of:

(a) changing the phase difference between the first and second beams at a constant rate;

(b) guiding the interference pattern into an array of photodetectors;

(c) integrating photocurrents produced by the individual photodetectors, respectively, to produce integrated buckets that correspond to intensities of various points across the interference pattern;

(d) measuring first, second, third and fourth integrated buckets produced by each photodetector at times that correspond to first, second, third, and fourth approximately 90 degree changes in the phase difference between the first and second beams while continuously maintaining the rate of change of the phase difference between the first and second beams at a constant value;

(e) computing a first phase value corresponding to each photodetector from the first, second, and third integrated buckets produced by that photodetector;

(f) computing a second phase value, corresponding to each photodetector, from the second, third, and fourth integrated buckets produced by that photodetector; and (g) adding the first and second phase values corresponding to each of the photodetectors to cancel sinusoidal error produced by small errors in the approximately 90 degree changes in the phase difference between the first and second beams.

2. The method of claim 1 wherein the second beam is a reference beam and step (a) includes changing the phase of the reference beam at the constant rate.

3. The method of claim 2 wherein the reference beam is produced by varying the phase of a first portion of a beam produced by a light source, and the second beam is produced by reflecting a second portion of the light source beam from a test surface to produce a test beam.

4. The method of claim 3 including using a two-beam interferometer to produce the reference beam and the test beam, and varying the phase of the reference beam by moving a reference mirror reflecting a portion of the light source beam at a constant velocity, and moving the reference mirror by applying a constant slope voltage ramp signal to a piezoelectrical transducer supporting the reference mirror, before performing step (d).

5. The method of claim 4 including allowing the piezoelectric transducer and reference mirror to attain a constant velocity before producing any of the integrated buckets to eliminate nonlinearities in the phase shift between the first and second phases.

6. The method of claim 1 wherein step (c) includes conducting photocurrents of the photodetectors into a plurality of integrated bucket capacitors, respectively, to produce the integrated buckets.

7. The method of claim 6 wherein the measuring of step (d) includes strobing various transfer devices coupling the respective integrated bucket capacitors to corresponding cells of a shift register device to discharge the integrated buckets from the integrated bucket capacitors into corresponding cells of the shift register device and to begin producing of subsequent integrated buckets.

8. The method of claim 7 including sequentially shifting the integrated buckets out of the shift register to produce an analog signal having various analog levels that represent the magnitudes of the various integrated buckets, respectively, amplifying the analog levels, and converting them to digital numbers, and reading the digital numbers representing the various integrated bucket magnitudes by means of a computer.

9. The method of claim 8 including performing steps (e), (f), and (g) by means of the computer.

10. The method of claim 1 wherein step (e) includes computing the first phase in accordance with the equation $$\phi_1(x) = \text{arctangent } (C-B)/(A-B),$$

and step (f) includes computing the second phase in accordance with the equation $$\phi_2(x) = \text{arctangent } (D-C)/(B-C),$$

wherein A is the magnitude of the first integrated bucket, B is the magnitude of the second integrated bucket, C is the magnitude of the third integrated bucket, and D is the magnitude of the fourth integrated bucket, and wherein step (g) includes producing an average phase in accordance with the equation $$\phi = (\phi_1(x) + \phi_2(x))/2.$$

11. The method of claim 10 wherein the first beam is a test beam reflected from a test surface, the method including computing the height of variations in the test surface in accordance with the equation $$h(x) = (\lambda/(4\pi))\phi(x).$$

12. The method of claim 10 further including determining if modulation of intensity of the reference beam caused in response to variations in the phase difference between the first and second beams exceeds a predetermined noise threshold before computing the first and second phases.

13. The method of claim 12 including assigning a predetermined mask value to an average phase variable for a particular photodetector if the modulation of the intensity corresponding to that photodetector does not exceed the predetermined noise threshold.

14. The method of claim 12 including determining whether the modulation of the intensity exceeds the predetermined noise threshold by performing the steps of comparing the absolute values of C−B, A−B, D−C, and B−C to the predetermined noise threshold and determining that the modulation of intensity is greater than the noise threshold if at least one of those quantities is greater than the predetermined noise threshold.

15. The method of claim 1 including determining a first group of intensities corresponding to integrated buckets produced by a predetermined group of photocells at a first phase difference between the first and second beams, shifting the phase difference between the first and second beams by 180 degrees, determining a second group of intensities detected by the same group of photocells, respectively, from the integrated buckets produced thereby, adding corresponding first and second intensities to cancel variations due to interference between the first and second beams and to obtain an average intensity value, and adjusting the filament voltage of a light source from which the first and second beams are derived so that the average intensity value equals a predetermined intensity level.

16. The method of claim 1 wherein the small errors are in the range of zero degrees to approximately five degrees.

17. A method of providing information representing the distribution of phase difference between first and second interfering beams, the first and second interfering beams producing an interference pattern, the method comprising the steps of:
(a) changing the phase difference between the first and second beams at a constant rate;
(b) guiding the interference pattern into a photodetector;
(c) integrating the interference pattern by of the photodetector to produce integrated buckets that correspond intensities of various points across the interference pattern;
(d) measuring first, second, third, and fourth integrated buckets produced by the photodetector at times that correspond to first, second, third, and fourth approximately 90 degree changes in the phase difference between the first and second beams while continuously maintaining the rate of change of the phase difference between the first and second beams at a constant value;
(e) computing a first phase value from the first, second, and third integrated buckets;
(f) computing a second phase value from the second, third, and fourth integrated buckets; and
(g) adding the first and second phase values to cancel sinusoidal error produced by small errors in the 90 degree changes in the phase difference between the first and second beams.

18. An interferometric apparatus comprising:
(a) means for producing first and second beams and causing the first and second beams to interfere, producing an interference pattern;
(b) means for changing a phase difference between the first and second beams at a constant rate;
(c) means for guiding the interference pattern into an array of photodetectors, the array of photodetectors including means for integrating photocurrents produced by the individual photodetectors, respectively, to produce integrated buckets that correspond to intensities of various points across the interference pattern;
(d) means for measuring first, second, third and fourth integrated buckets produced by each photodetector at times that correspond to first, second, third, and fourth approximately 90 degree changes in the phase difference between the first and second beams while the rate of change in the phase difference between the first and second beams remain constant;
(e) means for computing a first phase value corresponding to each photodetector from the first, second, and third integrated buckets produced by that photodetector;
(f) means for computing a second phase value, corresponding to each photodetector, from the second, third, and fourth integrated buckets produced by that photodetector; and
(g) means for adding the first and second phase values corresponding to each of the photodetectors to cancel sinusoidal error produced by small errors in the approximately 90 degree changes in the phase difference between the first and second beams.

19. The interferometric apparatus of claim 18 wherein the small errors are in the range from zero degrees to approximately five degrees.

20. The interferometric apparatus of claim 18 wherein the array of photodetectors is included in a self-scanning optical sensor array device having a plurality of clock input conductors and an analog output conductor on which voltages representative of integrated buckets scanned in response to the clock inputs are sequentially output, respectively.

21. The interferometric apparatus of claim 20 wherein the measuring means includes clock and data acquisition circuitry for producing a plurality of clock signals applied to the clock input conductors of the self-scanning optical sensor array device, a computer, an interface circuit coupled between the computer and the clock and data acquisition circuitry, a piezoelectric transducer driver circuit, and wherein the phase difference changing means includes a piezoelectric transducer responsive to the piezoelectric transducer driver circuit and a reference mirror supported by the piezoelectric transducer and reflecting one of the first and second beams and movable to vary the phase of that beam.

22. The interferometric apparatus of claim 21 wherein the clock and data acquisition ciruitry includes an amplifier for amplifying the voltages representative of the integrated buckets produced by the self-scanning optical sensor array device and an analog-to-digital converter for converting the amplified voltages into digital representations of the respective integrated buckets, the interface circuit including means for interfacing between the computer and the output of the analog-to-digital converter to enable the computer to read the digital representations of the integrated buckets in synchronization with the scanning of the self-scanning optical sensor array device.

23. The interferometric apparatus of claim 22 wherein the piezoelectric transducer driver circuit includes an address circuit that is incremented by one of the clock signals in synchronization with the clocking of the self-scanning optical sensor array device, a random access memory couple to the computer for storing information representative of a voltage ramp signal, a digital-to-analog converter for converting data output the random access memory in response to the address circuit for producing the voltage ramp signal, and an output amplifier for producing an amplified voltage ramp signal and applying it to the piezoelectric transducer.

24. The interferometric apparatus of claim 21 including means for allowing the piezoelectric transducer and the reference mirror supported thereby to attain a constant velocity before the measuring means begins measuring the first, second, and fourth integrated buckets.

* * * * *